(12) United States Patent
Petrie et al.

(10) Patent No.: US 7,997,603 B2
(45) Date of Patent: Aug. 16, 2011

(54) BICYCLE COMPONENTS MOUNTING METHODS AND APPARATUS

(75) Inventors: Thomas H. Petrie, Fort Collins, CO (US); Ross Shafer, Petaluma, CA (US)

(73) Assignee: Thomas H. Petrie, Fort Collins, CO (US)

( * ) Notice: Subject to any disclaimer, the term of this patent is extended or adjusted under 35 U.S.C. 154(b) by 0 days.

(21) Appl. No.: 12/675,385

(22) PCT Filed: Aug. 31, 2007

(86) PCT No.: PCT/US2007/077446
§ 371 (c)(1),
(2), (4) Date: Feb. 25, 2010

(87) PCT Pub. No.: WO2009/029115
PCT Pub. Date: Mar. 5, 2009

(65) Prior Publication Data
US 2010/0199481 A1    Aug. 12, 2010

(51) Int. Cl.
*B62J 1/02* (2006.01)
*B62K 21/14* (2006.01)

(52) U.S. Cl. ....... 280/275; 74/551.2; 267/132; 267/258; 280/283; 297/195.1

(58) Field of Classification Search .................. 280/275, 280/283, 276, 288.4; 29/897; 74/551.1, 74/551.2, 551.3, 551.8; 248/600, 601; 267/131–133, 257–258, 219, 281
See application file for complete search history.

(56) References Cited

U.S. PATENT DOCUMENTS

| | | |
|---|---|---|
| 2,274,747 A | 3/1942 | Schwinn |
| 3,055,687 A | 9/1962 | Hutton |
| 3,467,421 A | 9/1969 | Bentley |
| 3,989,263 A | 11/1976 | Stuck et al. |
| 4,369,998 A | 1/1983 | Blase |
| 5,048,891 A | 9/1991 | Yach |
| 5,222,781 A | 6/1993 | Mele |
| 5,308,140 A | 5/1994 | Yu |
| 5,319,995 A | 6/1994 | Huang |
| 5,551,753 A | 9/1996 | Glockl |
| 5,660,406 A | 8/1997 | Menze |

(Continued)

FOREIGN PATENT DOCUMENTS
WO    2009029115 A1    3/2009

OTHER PUBLICATIONS

Velo Saddles, velosaddles.com/technology.php Globe Suspension, May 15, 2007.

(Continued)

*Primary Examiner* — Anne Marie Boehler
(74) *Attorney, Agent, or Firm* — Santangelo Law Offices, P.C.

(57) ABSTRACT

Methods and apparatus may permit the mounting of bicycle components (16) such as seats, handlebars, and the like, to bicycles. A bicycle component mount (3) may be isolated from the structure of a bicycle. Forces generated at various points on the bicycle's structure may be substantially impeded or eliminated from transmission through an isolated bicycle component mount (3). Multidimensional motion of a bicycle component mount (3) may include rotational, translational, and rototranslational motion with progressive elastomeric resistance in multiple directions. A bicycle component mount (3) may exhibit movement about its own center of mass (12). Motions of a rider on a bicycle may be biomechanically compensated for by a bicycle component mount (3) to facilitate rider comfort, promote efficient transfer of rider motion to the operation of a bicycle, and decrease wear on bicycle components (16).

24 Claims, 10 Drawing Sheets

U.S. PATENT DOCUMENTS

| | | | |
|---|---|---|---|
| 5,921,145 | A | 7/1999 | Muser |
| 6,010,188 | A | 1/2000 | Yates |
| 6,019,422 | A | 2/2000 | Taormino et al. |
| 6,032,934 | A | 3/2000 | Wu |
| 6,079,774 | A | 6/2000 | Proust |
| 7,044,542 | B2 | 5/2006 | Muscat |

OTHER PUBLICATIONS

Bicycling, Gear, Everything Butt, Jul. 2007.
Bushingsinc.com, Bushings & Mounting Rubberflex; Jun. 11, 2007, 3 pages.
Wixroyd.com, Anti-vibration-bushes, Oct. 11, 2006 1 page.
Naval-technology.com, GMT Rubber-Metal-Technic Ltd., Jun. 11, 2007, 1 page.
Apexmolded.com, Apex Molded Products Company, Inc., Isolators, Jun. 11, 2007, 1 page.
Tech Products Corporation, Armor Plated Universal, Jun. 11, 2007, 2 pages.
Corryrubber.com, Corry Rubber Corporation, Stud Mount Series, Jun. 11, 2007, 3 pages.
www.geniebicycles.com; isolated seat tube technology; Jul. 12, 2007.
Earsc.com, EAR Specialty Composites, ISOLOSS Grommets; HD/VA Sandwich Mounts: Male-Male; Jun. 11, 2007, 2 pages.
Earsc.com, EAR Specialty Composites, ISODAMP and VersaDamp Equipment Mounts; Jun. 11, 2007, 2 pages.
Earsc.com, EAR Specialty Composites, ISOLOSS Equipment Mounts; Jun. 11, 2007, 2 pages.
Rubber-group.com; The Rubber Group, Isolation mounts; Jun. 11, 2007.
Vibrasystems.com; VibraSystems, Inc. Anti-Vibration Products; Jun. 11, 2007.
Thudbuster.com; 2006 Thudbuster LT, 2006 Thudbuster ST; printed Apr. 18, 2007.
International Application No. PCT/US2007/077446; International Search Report dated Oct. 6, 2008.
International Application No. PCT/US2007/077446; Written Opinion of the International Searching Authority dated Oct. 6, 2008.
International Application No. PCT/US2007/077446; International Preliminary Examination Report dated Sep. 3, 2009.
Parallel Australia Patent Application No. 2007358253; Examiner's Report dated Jan. 25, 2011.

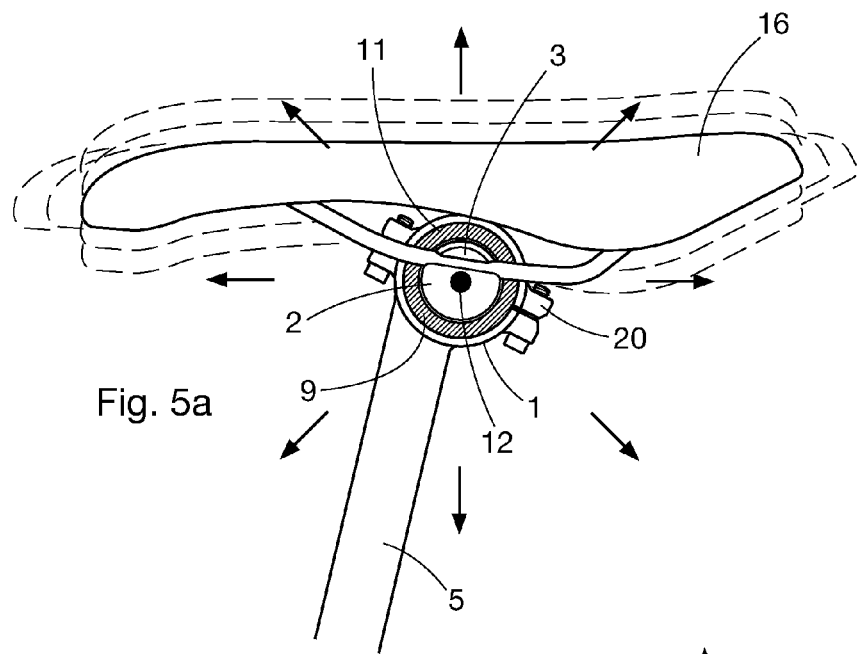
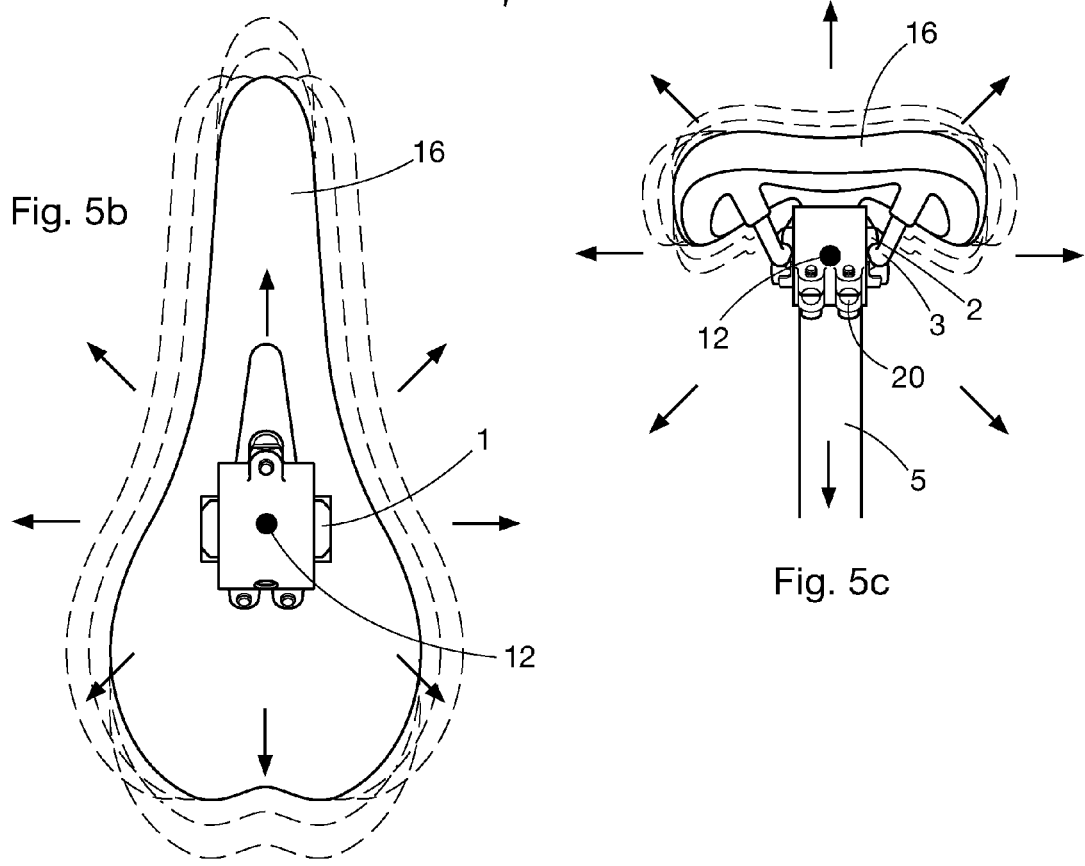

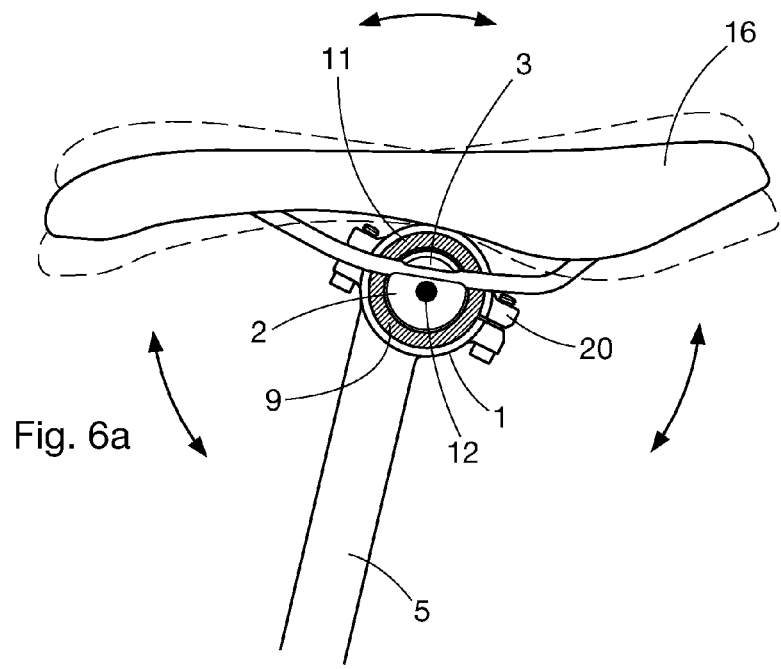
Fig. 6a
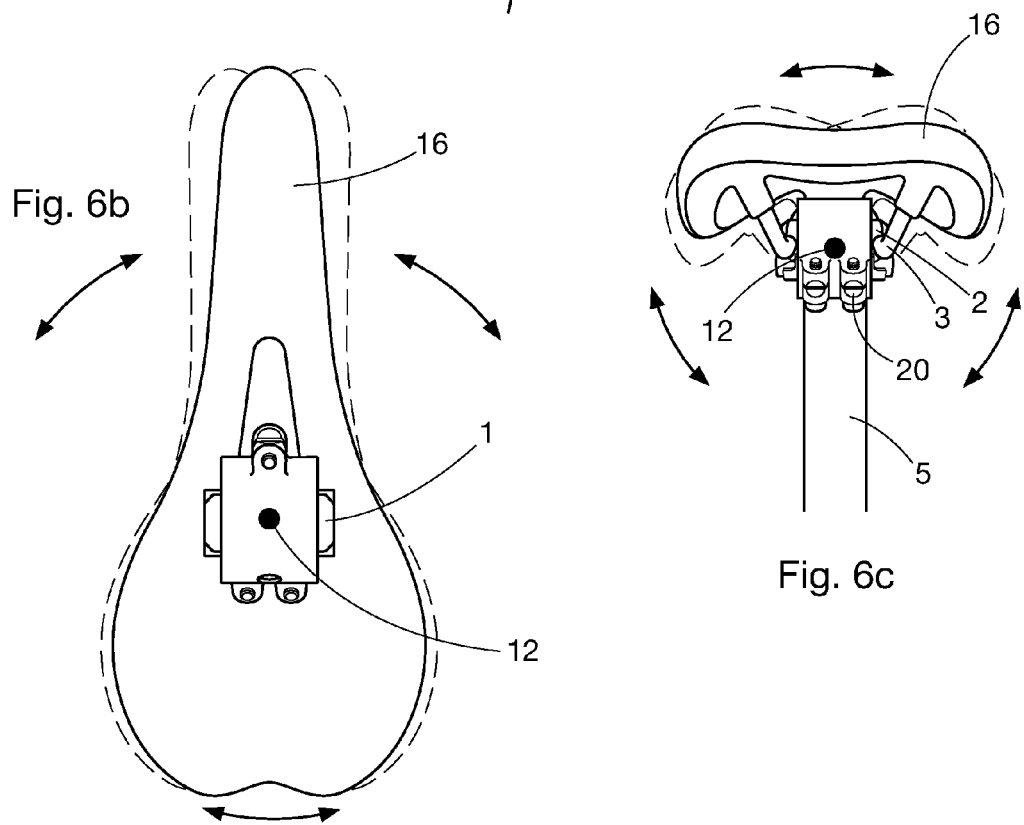
Fig. 6b
Fig. 6c

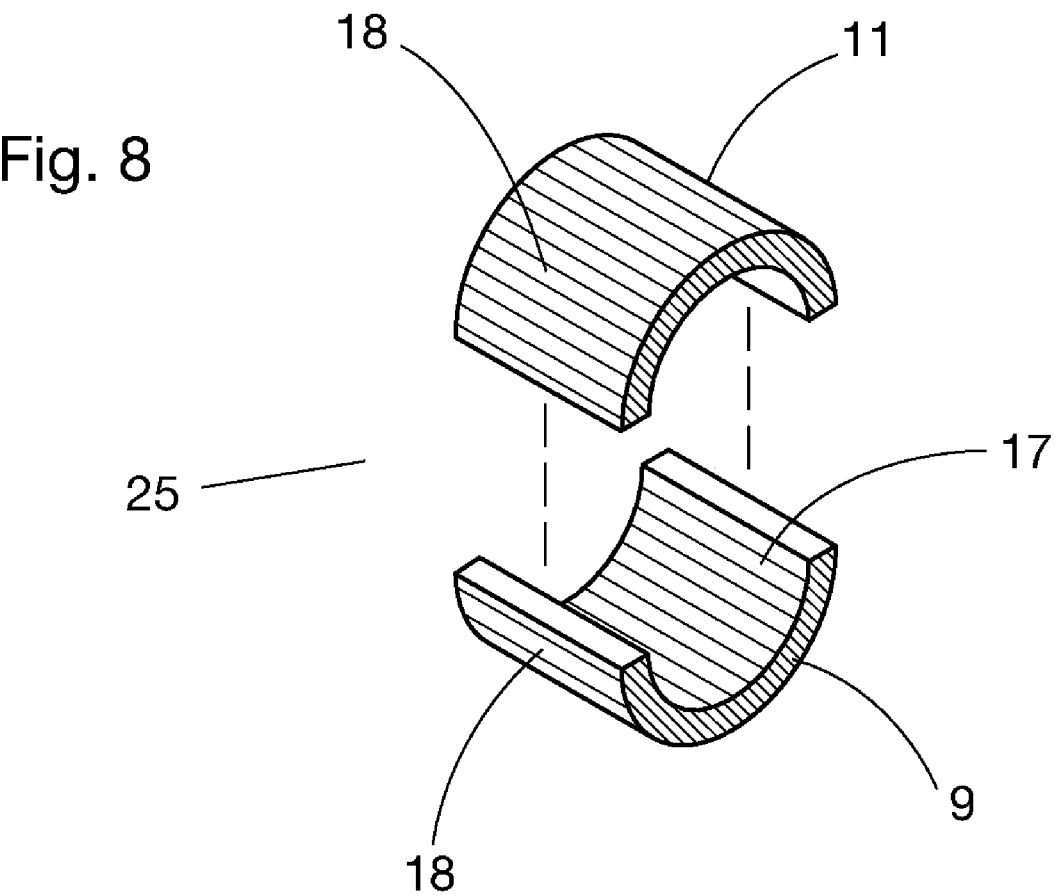

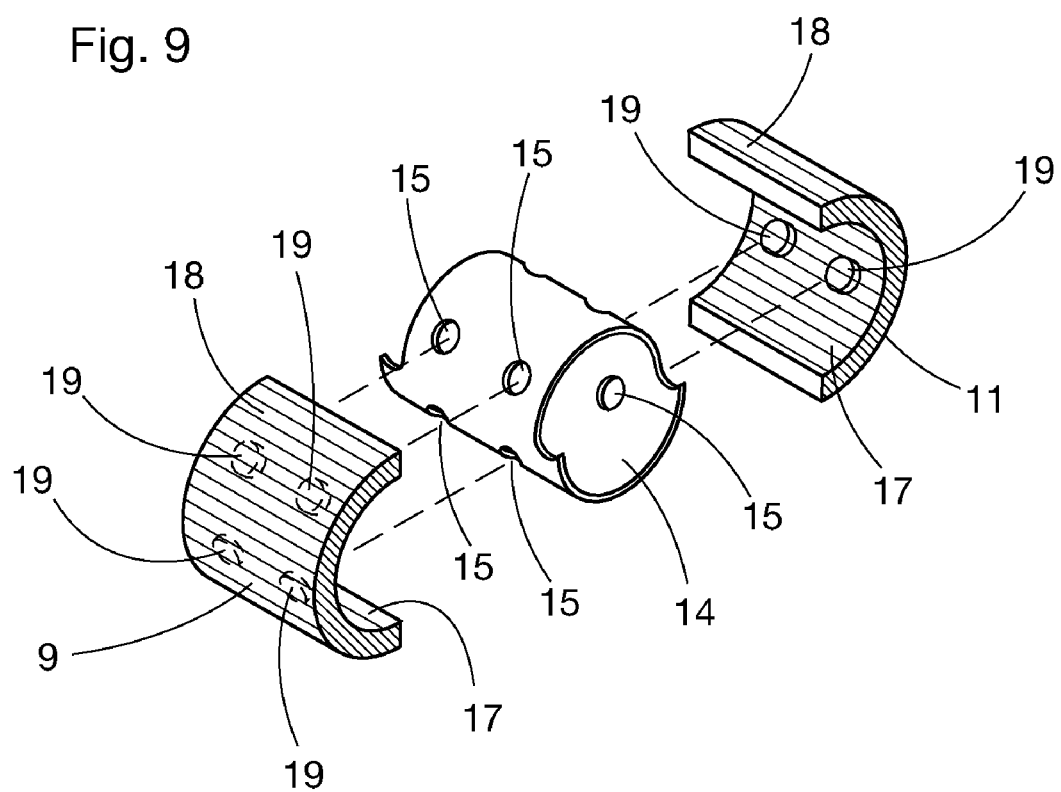

BICYCLE COMPONENTS MOUNTING METHODS AND APPARATUS

This application is the United States National Stage of International Application No. PCT/US2007/077446, filed 31 Aug. 2007, said patent application and any priority case hereby incorporated herein by reference.

TECHNICAL FIELD

Generally, the inventive technology described herein relates to methods and apparatus for mounting various types of bicycle components such as bicycle seats, bicycle handlebars, and the like. More specifically, the inventive technology may involve isolating such mounted bicycle components from other bicycle structures and resisting the transmission of kinetic forces through a bicycle component mount. The inventive technology may be particularly suited for providing an efficient biomechanical interface between a rider and a bicycle and may promote bicycle rider comfort.

BACKGROUND

Cycling is a popular activity in many countries around the world and a thriving cycling industry may have developed over many years to address the needs of cycling enthusiasts. Among these needs may be the desire to improve rider comfort, efficiency, and safety on a bicycle. For example, a bicycle in motion may produce a variety of stresses tending to reduce rider comfort. Such stresses may come from a number of sources, including perhaps from shock and vibration caused by the bicycle moving over a surface, or perhaps from resistance and hard points created where the rider's body interfaces with rigid bicycle components such as a seat, handlebar, or the like. Similarly, there may exist a desire to increase the efficiency by which rider motion is translated to the bicycle. For example, such efficiency may be affected by how efficiently the rider is able to work bicycle components, such as in cranking the pedals, gripping the handlebars, and the like. In addition, wear and fatigue on bicycle components over time may pose a safety risk to bicycle riders.

While such comfort, efficiency, and safety may be addressed at a variety of locations on a bicycle, one approach may have been to examine the nature in which a bicycle component may be mounted to a bicycle. For example, bicycle components such as seats, handlebars, and the like typically may not be manufactured as integrated with a bicycle frame, but rather more usually may be manufactured separately and mounted to the bicycle frame utilizing some kind of bicycle component mount. Traditionally, such bicycle component mounts may take the form of rigid connections, such as clamps, bolts, casings, and the like. For example, bicycle seats perhaps may be conventionally mounted by clamping a seat rail to a bicycle seat post which is in turn fitted to the bicycle frame. Similarly, handlebars perhaps may be conventionally mounted by attaching the handlebar through a rigid clamp. Of course, these examples are merely illustrative of the variety of components that may be mounted on bicycles via rigid connections.

Such conventional mounting techniques, however, may not be optimal for promoting rider comfort, efficiency, and safety as discussed above. In particular, the rigid nature of these connections may be seen to permit perhaps relatively unimpeded transfer of stresses to and from different parts of the bicycle. For example, shock and vibration from a surface over which the bicycle is moving may be readily transmitted through these rigid connections to a bicycle seat, handlebar, or the like, perhaps ultimately being absorbed by the body of the rider. Similarly, these rigid connections may not provide any flex in response to rider motion—for example when a seat is twisted from cranking a pedal or a handlebar is worked from a hand grip—perhaps resulting in the inefficient translation of rider motion to the bicycle. Moreover, rigid connections may be susceptible to wear and fatigue as bicycle components are worked over time. Accordingly, the cycling industry may have responded over time with various alternative configurations for bicycle component mounts.

However, many of these alternative configurations perhaps simply may not truly eliminate the rigid nature of the connection established through a bicycle component mount. While these designs may incorporate various kinds of force mitigating devices, such as perhaps springs, air cushions, elastomers, gels, and the like, nevertheless close examination of the design may reveal a rigid path still existing through which forces generated by the stresses described may readily travel, perhaps still ultimately resulting in rider discomfort. In addition, wear and fatigue may still be an issue at such rigid paths. Moreover, these force mitigating devices often may not be placed at the bicycle component mount itself, for example as where a spring may be placed within a bicycle seat post or an air cushion placed underneath a saddle of a bicycle seat. In such arrangements, the flex permitted by the device may not be at the mount itself, which may result in less than optimal efficiency in response to rider motion. In fact, the actual bicycle component mount in such designs frequently may be simply a conventional mount of the type already described.

Additionally, many of these alternative configurations perhaps may be relatively heavy, complicated, or occupy an inordinate amount of space on a bicycle frame. These considerations of course may be more than merely trivial. For example, modern bicycle construction may tend to emphasize lightweight and space-efficient design, particularly for professionals, serious amateurs, or competition cycling. Moreover, complicated designs perhaps may be prone to more difficult maintenance or easier breakage.

As a result, the alternative configurations discussed may have failed to produce a bicycle component mount that truly isolates the bicycle component from a rigid connection to the body of the bicycle, and that permits rider-responsive multi-dimensional motion of the bicycle component mount about its own structure. Accordingly, the foregoing problems regarding conventional bicycle component mounting technologies may represent a long-felt need for an effective solution to the same. While implementing elements may have been available, actual attempts to meet this need to the degree now accomplished may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY DISCLOSURE OF THE INVENTION

The inventive technology relates to methods and apparatus for mounting bicycle components on bicycles and may include one or more of the following features: techniques for isolating a bicycle component mount from a structural member of a bicycle; techniques for permitting movement of a bicycle component mount about its own center of mass; techniques for elastomerically resisting movements of a bicycle component from outside of a bicycle component interface disposed about the bicycle component; techniques for absorbing forces transmitted through a bicycle using a resiliently flexible force dampening medium interposed between rigid elements of a bicycle; techniques for confining multidimensional motion of a bicycle component mount with a progressively resistive elastomeric emplacement; techniques for biomechanically compensating for bicycle rider motion; and techniques for reducing unsafe wear of bicycle components. Accordingly, the objects of the bicycle components mounting methods and apparatus described herein address each of the foregoing in a practical manner. Naturally, further objects of the inventive technology will become apparent from the description and drawings below.

BRIEF DESCRIPTION OF THE DRAWINGS

FIG. 5a is a side view of translational motion of a bicycle component mount in one embodiment.

FIG. 5b is a top view of translational motion of a bicycle component mount in one embodiment.

FIG. 5c is a rear view of translational motion of a bicycle component mount in one embodiment.

FIG. 6a is a side view of rotational motion of a bicycle component mount in one embodiment.

FIG. 6b is a top view of rotational motion of a bicycle component mount in one embodiment.

FIG. 6c is a rear view of rotational motion of a bicycle component mount in one embodiment.

FIG. 8 is a perspective view of a separable component established as two separate pieces.

FIG. 9 is a perspective view of contact openings disposed on an intermediate sleeve structure.

MODES FOR CARRYING OUT THE INVENTION

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
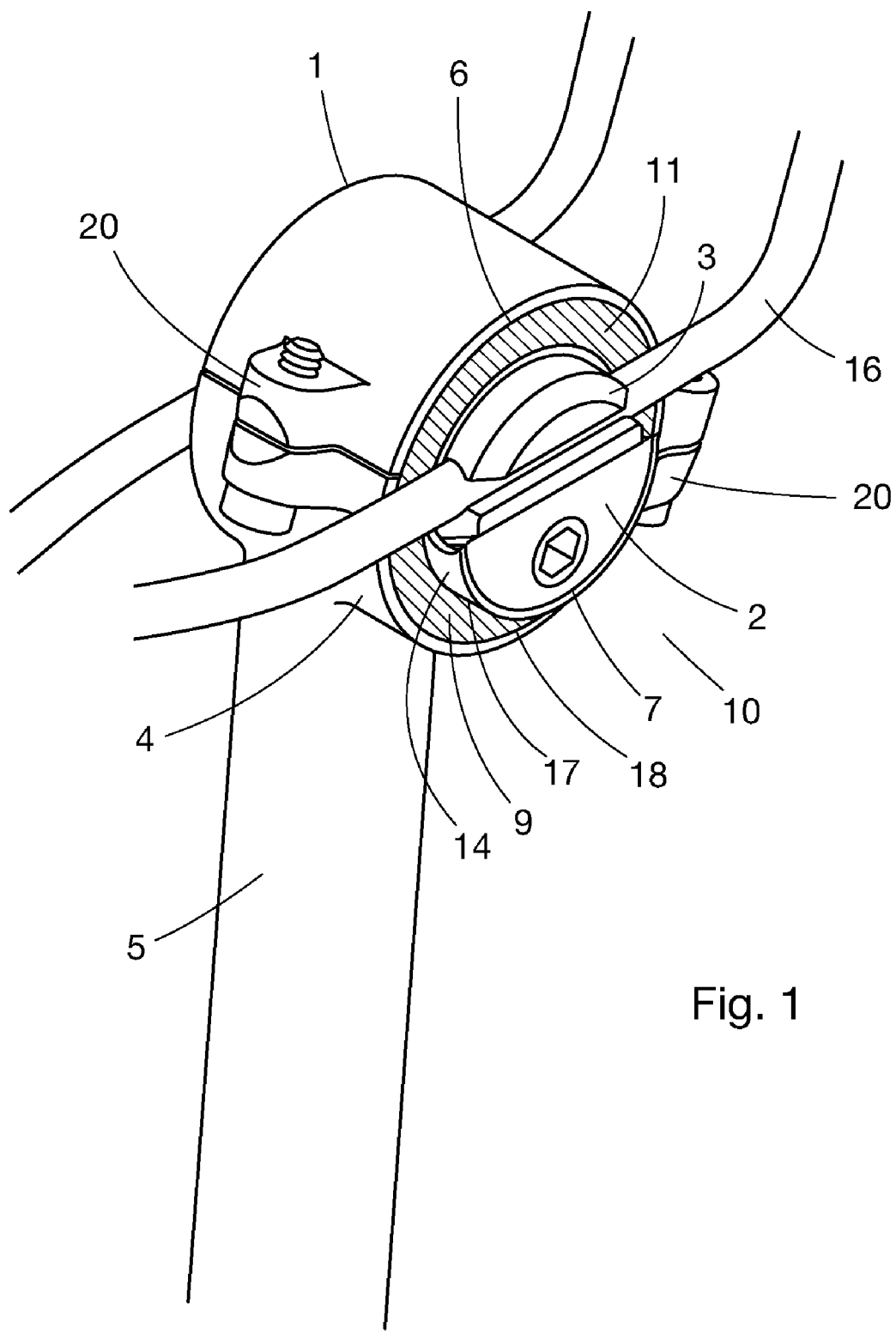
FIG. 1 is a perspective view of a bicycle seat clamp in one embodiment.
Figure 3:
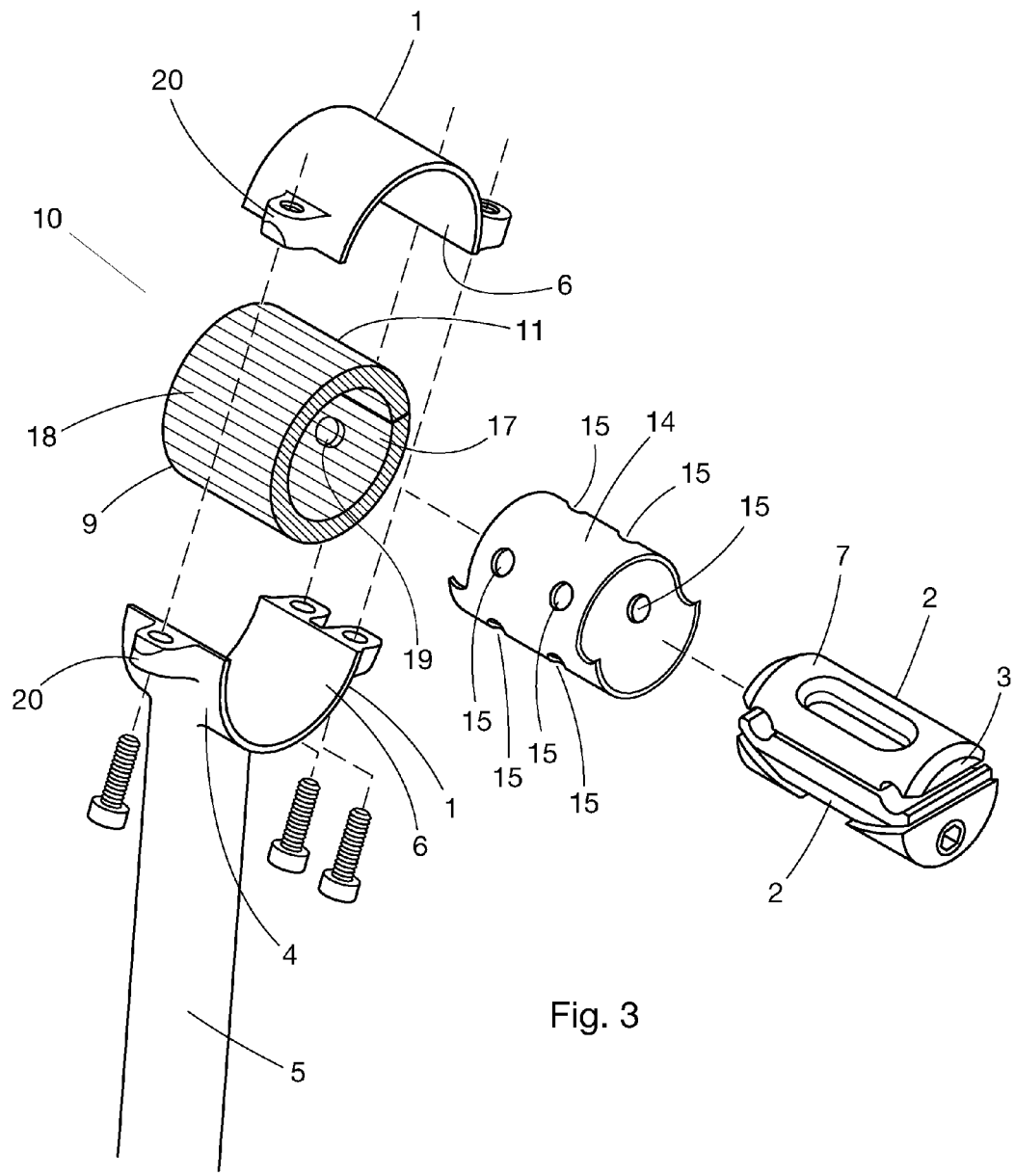
FIG. 3 is an exploded view of a bicycle component mount in one embodiment.

Now referring primarily to FIGS. 1 and 3, various embodiments may involve the use of a substantially rigid outer housing (1) and a substantially rigid inner housing (2). Such housings may include perhaps simply structures within which other objects may be contained, perhaps in whole or perhaps in part. For example, a substantially rigid inner housing (2) may be contained within a substantially rigid outer housing (1), a bicycle component mount (3) may be contained within a substantially rigid inner housing (2), and so forth. Such substantially rigid housings in various embodiments may be made of metal, plastics, composites, or other suitably rigid materials.

In some embodiments, a substantially rigid outer housing (1) may have an exterior surface (4) configured to be joined to a structural member (5) of a bicycle. Structural members (5) may include any suitable bicycle structures, such as various kinds of posts, forks, shafts, or the like, and joinder may be by any suitable means, such as mechanical fastening, welding, clamping or the like. In addition, a substantially rigid outer housing (1) may have an interior surface (6) formed by an opening established through the housing. Such an opening may be of any suitable size or shape consistent with the principles discussed herein. For example, as discussed in detail herein throughout, the opening may be suitably configured to permit placement of various items within the housing, such as a resiliently flexible force dampening medium (9), a progressively resistive elastomeric emplacement (11), a substantially rigid inner housing (2), a bicycle component interface (13), and the like. Moreover, embodiments may involve compressing the outer housing, perhaps as with an exterior clamp (20) to which the outer housing may be compressively responsive, for example so as perhaps to tighten the outer housing about various elements disposed within the outer housing.

A substantially rigid inner housing (2) in various embodiments may have an exterior surface (7). This inner housing may be disposed within the opening through a substantially rigid outer housing (1), for example perhaps so that the exterior surface (7) of the inner housing faces the interior surface (6) of the outer housing, perhaps in part or perhaps in whole. In addition, a substantially rigid inner housing (2) may be configured to be joined to a bicycle component mount (3). A bicycle component mount (3) may include any suitable attachment to which a bicycle component (16) may be connected consistent with the principles discussed herein, for example such as clamps, bolts, housings, and the like. Moreover, joinder also may be effected by any suitable manner consistent with the principles discussed herein. For example, some embodiments may include simply fastening a bicycle component mount (3) to a substantially rigid inner housing (2), while in other embodiments a bicycle component mount (3) and substantially rigid inner housing (2) may be integrated as a single unit.

As discussed in more detail herein throughout, various kinds of structural members (5), bicycle component mounts (3), and bicycle components (16) may be used consistent with the principles discussed herein. For example, in various bicycle seat embodiments of the inventive technology, a structural member (5) may be a bicycle seat post, a bicycle component mount (3) may be a bicycle seat clamp, and a bicycle component (16) may be a bicycle seat. Similarly, various handlebar embodiments of the inventive technology may involve a structural member (5) as a bicycle handlebar stem, a bicycle component mount (3) as a bicycle handlebar clamp, and a bicycle component (16) as a bicycle handlebar. Of course, these examples are merely illustrative and should not be construed to limit the various elements of a bicycle to which the principles discussed herein may be applied. For example, the inventive principles discussed herein perhaps may be applied to any suitable bicycle part wherein it may be desirable to replace a substantially rigid connection with a more flexible connection.

Additionally, various embodiments may involve motions created at different kinds of structural members (5) or bicycle components (16). Such motions may be the result of typical bicycle riding events, such as shocks or vibrations of the bicycle in motion over a surface or rider motions such as cranking the bicycle's pedals, riding the bicycle's seat, gripping the bicycle's handlebars, and the like. For example, some embodiments may involve creating a motion at a structural member (5) of a bicycle, such as at a seat post, handlebar stem, or the like, for example perhaps due to shocks or vibrations as described. Likewise, some embodiments may involve creating motion at a bicycle component (16), such as at a seat mounted on a seat clamp, a handlebar mounted on a handlebar clamp, or the like, for example perhaps due to rider motions interacting with the component as described.

Of course, these created motions may generate a corresponding kinetic force, which may be capable of being transmitted to other parts of a bicycle through the bicycle frame and inducing motions in various bicycle elements along the path of transmission, such as shocks, vibrations, and the like. For example, a kinetic force resulting from a motion created at a structural member (5) of a bicycle in various embodiments may be transmitted to a substantially rigid outer housing (1). Likewise, a kinetic force resulting from a motion created at a bicycle component (16) in various embodiments may be transmitted to a substantially rigid inner housing (2). The transmitted kinetic force reaching an inner housing or outer housing ultimately may encounter a resiliently flexible force dampening medium (9) or progressively resistive elastomeric emplacement (11), as described in greater detail elsewhere herein. Some embodiments may involve transmitting a kinetic force across a bicycle component interface (13), described more fully elsewhere herein, to a resiliently flexible force dampening medium (9), including perhaps across an interior surface (17) of the medium or perhaps across an intermediate sleeve structure (14) disposed about a bicycle component (16).

In various embodiments, a space may be formed between a substantially rigid inner housing (2) and a substantially rigid outer housing (1). Embodiments may involve interposing a resiliently flexible force dampening medium (9) between an exterior surface (7) of the inner housing and an interior surface (6) of the outer housing. Such a resiliently flexible force dampening medium (9) may include any media suitable to achieve the force transmission dynamics discussed herein. For example, the medium in various embodiments may include various kinds of elastomers, springs, pneumatic cushions, gels, and the like. The term force dampening may be understood to involve a property of the medium tending to dampen to at least some degree a force transmitted through the medium. Likewise, the term resiliently flexible may be understood to include at least some degree of flex of the medium in response to an external force, but tending to rebound to the original condition of the medium.

In certain embodiments, a resiliently flexible force dampening medium (9) may have an exterior surface (18) disposed within the interior surface (6) of a substantially rigid outer housing (1), and an interior surface (17) formed by an opening established through the medium. Embodiments may further involve various elements placed within the opening established through the medium, such as a substantially rigid inner housing (2) or a bicycle component interface (13), as discussed elsewhere herein.

Embodiments also may involve placing an interposed resiliently flexible force dampening medium (9) in an isolationally configured arrangement (10) about a substantially rigid inner housing (2), so as to perhaps isolate the inner housing from the outer housing. Such isolationally configured arrangements may involve perhaps eliminating substantially rigid connections between the inner housing and the outer housing—in this manner, the inner housing and the outer housing may be considered as isolated from one another by the interposed resiliently flexible force dampening medium (9). For example, such isolation may include the resiliently flexible force dampening medium (9) arranged as a sole bicycle contact point between the inner housing and outer housing, wherein all bicycle structure on the outer housing side may be in contact with all bicycle structure on the inner housing side solely through the medium. Similarly, such isolation may include the resiliently flexible force dampening medium (9) arranged as a sole bicycle force transmission path between the inner housing and outer housing, wherein forces generated on either the outer housing or inner housing side may be routed to the other housing side solely through the medium.

Structurally, an isolationally configured arrangement (10) in some embodiments may be effected by embedding a substantially rigid inner housing (2) within a resiliently flexible force dampening medium (9), and embedding the resiliently flexible force dampening medium (9) within a substantially rigid outer housing (1). Embedding may include perhaps tightly enveloping, enclosing, or the like, in whole or at least in part, the medium about the inner housing and the outer housing about the medium. However, an isolationally configured arrangement (10) of course may be effected in other suitable dispositions of the housings and the medium. For example, an isolationally configured arrangement (10) in various embodiments perhaps may involve simply the structure of a bicycle component mount (3) joined to a substantially rigid inner housing (2), as perhaps embodied by the center of mass (12) of the mount and inner housing, merely as being configured to be solely motionally responsive to a resiliently flexible force dampening medium (9). Such embodiments may involve restricting a movement of the center of mass (12) solely with the medium.

In addition, an isolationally configured arrangement (10) in various embodiments may be facilitated by interposing a resiliently flexible force dampening medium (9) about a substantially rigid inner housing (2). Understood in connection with such isolation, the term about may involve surrounding the inner housing with the medium on all sides in at least one dimension. For example, such a one dimensional surrounding may include a planar arrangement, such as a circular or elliptical arrangement of the medium about the inner housing. Of course, the term about may be understood to include multi-dimensional arrangements as well, such as perhaps tubular or spherical configurations. Moreover, in various embodiments, the arrangement of the medium about the inner housing may be at discrete points of contact, such as may result for example when multiple springs, multiple elastomer balls, or the like are connected to the inner housing, or may be continuous, such as may result when the inner housing is embedded in an elastomer.

Now further considering the space that may be formed between a substantially rigid inner housing (2) and a substantially rigid outer housing (1), as hereinbefore described, a bicycle component mount (3) joined to a substantially rigid inner housing (2) in some embodiments may be emplaced within a progressively resistive elastomeric emplacement (11) occupying such a space. Such a progressively resistive elastomeric emplacement (11) may include any emplacement for a substantially rigid inner housing (2) suitable to achieve the motion dynamics of the inner housing discussed elsewhere herein. For example, the emplacement in various embodiments may act to progressively resist motion of the inner housing, perhaps as wherein the resistance of the emplacement increases in proportion to the distance over which the inner housing is displaced from its resting position. Likewise, the elastic nature of the emplacement may be such as to rebound to its original configuration, perhaps as in bias so as to tend to return the inner housing to its original resting position.

It should be noted that for various embodiments, a resiliently flexible force dampening medium (9) and a progressively resistive elastomeric emplacement (11) may entail overlapping structures, in some cases perhaps being embodied in the same structure. For example, in various embodiments a progressively resistive elastomeric emplacement (11) may include perhaps various kinds of elastomers, springs, pneumatic cushions, gels, and the like, as may be the case for a resiliently flexible force dampening medium (9). Nevertheless, the medium and the emplacement may be understood to be serving distinct functions. In particular, the medium may be understood as fulfilling a force dampening function for forces transmitted from one part of a bicycle to another, while the emplacement may be understood as fulfilling a motion resistance function for an inner housing moving within an outer housing. However, the reader is advised the distinction as characterized here merely is a shorthand illustration for the convenience of the reader and should not be construed as limiting the functions of the medium and emplacement—the precise nature of their functionality should be referred to as described in greater detail elsewhere herein. The purpose of the distinction here described merely is to illustrate that while the medium and the emplacement may have overlapping or common structures in some embodiments, nevertheless their functionality may still be distinguished from one another.

The term emplacing may be understood to include perhaps simply positioning a substantially rigid inner housing (2) within a progressively resistive elastomeric emplacement (11), for example perhaps so as to support the inner housing within the emplacement. Moreover, embodiments may involve a multidirectional arrangement of the emplacement about a substantially rigid inner housing (2). Such a multidirectional arrangement may include arranging the emplacement on two or more sides of the inner housing so as to respond to multiple directions of travel of the inner housing undergoing multidimensional motion, as described in more detail elsewhere herein. Of course, responsiveness of the emplacement may include resistance, deformation, flex, or other motional behaviors of the emplacement. For example, embodiments may involve progressively elastomerically resisting the movement of a center of mass (12), described elsewhere herein, in multiple directions about the inner housing with the emplacement. The progressiveness of such resistance may involve increasing the level of resistance offered by the emplacement in proportion to the distance traveled by the center of mass (12) from its resting location, while the elasticity may tend to rebound the emplacement to its original configuration as the force moving the center of mass (12) decreases. Additionally, in the context of progressively elastomerically resisting, the term about may involve arrangement of the emplacement surrounding the inner housing on all sides in at least one dimension, at discrete points of contact, or in continuous contact, as described previously with respect to a resiliently flexible force dampening medium (9).

Now with reference primarily to FIGS. 5 and 6, in various embodiments, a bicycle component mount (3) joined to a substantially rigid inner housing (2) may have a center of mass (12). For example, in various bicycle seat embodiments, a substantially rigid inner housing (2) may have a cylindrical shape, and the bicycle component mount (3) may be a rail clamp positioned on each end of the cylinder. In such a configuration, the center of mass (12) would be defined by the mass of the cylinder and two rail clamps, and likely would be located at the centerpoint of the cylinder. Of course, this example is merely illustrative of one embodiment for a center of mass, and should not be construed to limit the possible configurations for a center of mass consistent with the principles described herein.

Naturally, motions through which the mount joined to the inner housing may undergo may be described in terms of motions affecting the center of mass (12). For example, embodiments may involve a range of motion of the center of mass (12) delimited by the degree of elasticity of a progressively resistive elastomeric emplacement (11) in which the inner housing may be emplaced. Where the resting center of mass (12) of the mount joined to the inner housing coincides with the center of mass of a substantially rigid outer housing (1), for example, the range of motion of the mount joined to the inner housing may be measured in terms of the possible directions and distance of travel from the center of mass of the outer housing, as a function of the elasticity of the emplacement. Accordingly, the range of motion of the center of mass (12) of the mount joined to the inner housing may be delimited by the action of progressively elastomerically resisting such motion. Moreover, the action of progressively elastomerically resisting in various embodiments naturally may be accomplished with a progressively resistive elastomeric emplacement (11).

Of course, the type of motion to which a center of mass (12) may undergo may be a function of the arrangement of the substantially rigid inner housing (2) emplaced within a progressively resistive elastomeric emplacement (11) contained within a substantially rigid outer housing (1), as hereinbefore described. It may be appreciated that such an arrangement may permit multidimensional motion of the center of mass (12) confined within the interior space of the outer housing and restricted by the progressive elastomeric resistance of the emplacement. The term multidimensional, of course, may be understood to involve movements in more than one dimension. For convenience, one-dimensional motion may be thought of as linear motion, two-dimensional motion may be thought of as planar motion, and three dimensional motion may be thought of as motion in an unbounded sphere or other volumetric shape. Accordingly, a center of mass (12) may be seen to be permitted, by the housing and emplacement configurations of the inventive technology, to undergo translational motion (which may involve spacially translating a position of the center of mass (12)), rotational motion (which may involve merely rotating the center of mass (12) about itself at a fixed position), or perhaps even rototranslational motion (which may involve a combination of both translational and rotational motion). Moreover, such motions of course may be seen to be permitted a degree of freedom in one dimension, two dimensions, or even three dimensions, again subject perhaps only to the degree of elasticity of the emplacement.

A progressively resistive elastomeric emplacement (11) in various embodiments of course may be disposed within a substantially rigid outer housing (1). In connection with the motion resistance aspects of the emplacement, the outer housing (1) may be considered to be a motionally resistive substantially rigid outer housing (1). The term motionally resistive may include a property of the outer housing tending to resist motion of the emplacement, for example perhaps due to a structural rigidity. In this manner, the outer housing may be seen to provide a stable support for the emplacement while the emplacement may be elastically deformed by motion of the inner housing.

Moreover, movement of a center of mass (12) of a bicycle component mount (3) joined to a substantially rigid inner housing (2) may result from transmitted kinetic forces generated by motions created at various kinds of bicycle components (16) or structural members (5), as described elsewhere herein. For example, embodiments may involve creating motion at a bicycle seat, transmitting a kinetic force generated by such motion to a bicycle seat clamp on which the bicycle seat is mounted, and moving a center of mass of an inner housing to which the bicycle seat clamp is joined. Likewise, embodiments may involve creating motion at a bicycle handlebar, transmitting a kinetic force generated by such motion to a bicycle handlebar clamp, and moving a center of mass of a substantially rigid inner housing to which the bicycle handlebar clamp is joined. Of course, the types of motions involved may be any as related to operating a bicycle, including perhaps shocks, vibrations, or rider motions as discussed herein, and may act on any relevant elements of a bicycle.

Now with further reference to FIGS. 7(a) to 7(d), the shapes of a substantially rigid outer housing (1), substantially rigid inner housing (2), resiliently flexible force dampening medium (9), and progressively resistive elastomeric emplacement (11) may be selected to affect the performance characteristics of the force dampening and motion resistance principles discussed herein. In some embodiments, for example, the outer housing may be an annular substantially rigid outer housing (1), the medium may be an annular resiliently flexible force dampening medium (9), and the emplacement may be an annular progressively resistive elastomeric emplacement (11). Moreover, the medium or emplacement may be concentrically disposed within the annular outer housing, and the inner housing may be concentrically disposed within the medium or emplacement. Such a configuration may provide certain performance characteristics for the force dampening and motion resistance functions described herein. However, it may be appreciated that other kinds of performance characteristics may be obtained by altering the shapes of the various elements, for example in various kinds of elliptical or polygonal configurations, or by altering the concentric disposition of the various elements, for example in off-center or off-axis configurations. In addition, the term annular should be broadly understood to encompass for example perhaps simply an object having a continuous space formed through its body in the nature of an annulus, but otherwise dimensioned in any configuration suitable for application to the principles discussed herein. For example, an annular object in various embodiments may involve a ring-like structure, a doughnut-like structure, a hollow tube-like structure, a pipe-like structure, and so forth, and may perhaps include circular, elliptical, polygonal, irregular, or other kinds of shapes, and perhaps even may include various thicknesses for the walls of the annulus and lengths for its overall displacement.

For example, various embodiments may involve establishing a uniform cross-sectional profile. The term cross-sectional profile may involve taking the profile of an object through a cross-section oriented perpendicular to the object's lengthwise axis. On a bicycle, for example, a cross-sectional profile of a post in various embodiments may be a circle, an ellipse, or the like. By the term uniform cross-sectional profile, it may be understood that the cross-sectional profile for an object taken at any point along its lengthwise axis may be the same as for any other point along its lengthwise axis. Again, with reference to a bicycle, posts of constant diameter may be understood as an example of a uniform cross-sectional profile.

Accordingly, embodiments may include establishing a uniform cross-sectional profile along a lengthwise axis of an annular substantially rigid outer housing (1), a substantially rigid inner housing (2), and either of an annular resiliently flexible force dampening medium (9) or annular progressively resistive elastomeric emplacement (11) placed between the inner and outer housing. For example, some embodiments may involve establishing the inner housing and outer housing as cylinders, with each cylinder dimensioned uniformly in cross-section as a circle (21). Similarly, some embodiments may involve retaining the inner housing as a cylinder dimensioned uniformly in cross-section as a circle, but establishing the outer housing as a cylinder dimensioned uniformly in cross section as an ellipse (22). The orientation of the ellipse of course may be in any direction suitable to obtain a desired performance characteristic. For example, in some embodiments the ellipse may be horizontally oriented with respect to the front end and rear end of a bicycle. Of course, these examples are merely illustrative of the concept of a uniform cross-sectional profile, and should not be construed to limit the possible configurations for such a profile consistent with the principles discussed herein.

Embodiments also may include establishing a varied cross-sectional profile along a lengthwise axis of an annular substantially rigid outer housing (1), a substantially rigid inner housing (2), and either of an annular resiliently flexible force dampening medium (9) or annular progressively resistive elastomeric emplacement (11) placed between the inner and outer housing. By the term varied cross-sectional profile, it may be understood that the cross-sectional profile for an object taken at any point along its lengthwise axis may be at a variance as compared to another point along its lengthwise axis. For example various embodiments may involve establishing the outer housing as hourglass-shaped. In this manner, it may be seen that taking cross-sections along the lengthwise axis of the hourglass shape will produce profiles of varied dimension. For example, some embodiments perhaps may involve an hourglass-shaped outer housing dimensioned in cross-section as a circle (23), thus perhaps producing circles of varied diameter along the cross-sectional profile, while other embodiments perhaps may involve an hourglass-shaped outer housing dimensioned in cross-section as an ellipse (24), thus perhaps producing ellipses of varied major and minor axes along the cross-sectional profile. Of course, these examples are merely illustrative of the concept of a varied cross-sectional profile, and should not be construed to limit the possible configurations for such a profile consistent with the principles discussed herein.

Moreover, the configuration of the interior volume between an annular substantially rigid outer housing (1) and a substantially rigid inner housing (2) may be a function of their particular cross-sectional profiles. Accordingly, an annular resiliently flexible force dampening medium (9) or annular progressively resistive elastomeric emplacement (11) placed between the inner and outer housing in some embodiments may have a varied degree of thickness corresponding to the volume defined by the cross-sectional profile.

For example, where an outer housing may have an elliptical cross-sectional profile and an inner housing may have a circular cross-sectional profile, the medium or emplacement perhaps may be thicker at the elongated ends of the ellipse. This variation in thickness may be utilized in various embodiments to affect the performance characteristics of the medium or emplacement. For example, for bicycle seat embodiments, where the ellipse is horizontally oriented with respect to the front end and rear end of a bicycle, the areas of lesser thickness may serve to limit vertical nose and tail rocking motion of a bicycle seat. In various contexts, this may facilitate rider comfort and biomechanical efficiency of rider motion on a bicycle.

Similarly, where an outer housing may have an hourglass-shaped cross-sectional profile and an inner housing may have a circular cross-sectional profile, the medium or emplacement perhaps may be configured as pinched toward the middle and flared toward the ends. Again, this varied thickness in various embodiments may be utilized to affect the performance characteristics of the medium or emplacement. For example, for bicycle seat embodiments, the varied thickness of the pinched and flared configuration may serve as a motion bias tending to favor side to side rocking and swivel rocking of a bicycle seat. This again may facilitate rider comfort and biomechanical efficiency of rider motion on a bicycle in various embodiments.

An outer housing in some embodiments perhaps even may be hourglass-shaped and elliptical in cross section. A medium or emplacement in such embodiments consequently may include perhaps both a greater thickness at the elongated ends of the ellipse as well as a pinched and flared configuration. In this manner, for bicycle seat embodiments, the medium or emplacement may act as a motion element tending to affect motion of a bicycle seat perhaps including some or all of limiting vertical nose and tail rocking motion of a bicycle seat, biasing in favor of side to side rocking, and biasing in favor of swivel rocking. Moreover, the cumulative effect of such limiting and biasing of bicycle seat motion may be to facilitate rider comfort and biomechanical efficiency, perhaps by permitting natural bicycle seat movement to compensate for rider motion acting on the seat as the rider cranks the pedals of the bicycle.

Still further variables may exist in various embodiments to select a desired performance characteristic for the substantially rigid outer housing (1), substantially rigid inner housing (2), resiliently flexible force dampening medium (9), and progressively resistive elastomeric emplacement (11). For example, the outer housing may have a constant diameter in some embodiments, but nevertheless the diameter may be varied to create bulging shapes, scooped shapes, or other shapes for the outer housing. Similarly, the medium and emplacement may have a uniform thickness in some embodiments, but likewise the thickness may be adjusted to various dimensions and configurations.

Of course, the foregoing examples should not be construed to limit the potential cross-sectional profile configurations and their effects on force dampening and motion resistance consistent with the principles described herein. For example, embodiments perhaps may provide simply for selecting a cross-sectional profile to provide a desired biomechanical response to rider motion. Such a biomechanical response perhaps may include simply facilitating motions of a bicycle tending to favorably interact with a rider on the bicycle, such as to promote rider comfort or the biomechanical efficiency of the rider in operating the bicycle. The precise cross-sectional profile perhaps may be tailored, consistent with the principles discussed herein, to provide a biomechanical response to factors including rider weight, rider height, rider gender, rider skill, rider preference, and the like, or perhaps even merely to limit motion in a preferred direction or bias motion in a preferred direction, as may be the case for bicycle seat embodiments. Of course, embodiments may include varying the thickness of a medium or emplacement, varying the shape of an outer housing, or varying the shape of an inner housing to produce any appropriate cross-sectional profile to produce a desired effect consistent with the principles discussed herein.

Additionally, embodiments may include vertically orienting or horizontally orienting the substantially rigid outer housing (1), substantially rigid inner housing (2), resiliently flexible force dampening medium (9), and progressively resistive elastomeric emplacement (11). It may be appreciated that a vertically oriented structure of these elements may permit axial loading of the structure, while a horizontally oriented structure of these elements may permit radial loading of the structure. For example, in some embodiments a horizontally oriented structure may be placed on a bicycle frame to straddle about a lengthwise axis of a structural member (5) of a bicycle, as may be the case where an outer housing may be joined to the top end of a bicycle seat post, bicycle handlebar stem, or the like. In such a configuration, top-down or bottom-up compression and expansion may act to compress the medium or elastomer along its radius, creating radial loading. Moreover, such horizontal orientations may permit a bicycle component mount (3) to be joined at each end of a horizontally oriented inner housing, for example so as to be perhaps cantilevered on each side of a straddled structural member (5) of a bicycle. For instance, such cantilevered mounts in some embodiments may be rail clamps for attachments to bicycle seat rails, thus perhaps permitting a bicycle seat to be mounted to a bicycle seat post while enjoying the force dampening and motion resistance properties discussed herein. Of course, these examples are merely illustrative, and the horizontal orientations, vertical orientations, and indeed other kinds of orientations described herein may be used at a variety of locations on a bicycle using various kinds of structural members, mounts, and components.

Now with reference primarily to FIG. 8, a resiliently flexible force dampening medium (9) and a progressively resistive elastomeric emplacement (11) in various embodiments may be made of any of various materials, so long as the material may permit functionality of the medium or emplacement consistent with the principles discussed herein. For example, in various embodiments, the medium or emplacement may include an elastomer, a polymer, neoprene, rubber, foam, one or more springs, a pneumatic cushion, gel, and the like. Moreover, in various embodiments the medium or emplacement may be interchangeable. Such interchangeability may involve removing and replacing a particular medium or emplacement from the space between a substantially rigid inner housing (2) and a substantially rigid outer housing (1), such as by sliding the medium or emplacement in and out along a slide path between the inner and outer housing, by opening up the outer housing as through a hinge, or the like. The interchangeability of course may allow replacement of a worn medium or emplacement without needing to discard the entire housing structure, and in fact may permit modification of the performance characteristics of the housing structure by being able to change properties of the medium or emplacement such as shape, elasticity, resistance, and the like.

Of course, replacing a medium or emplacement may involve more than simply changing out a worn element. Rather, such replacement may be undertaken perhaps simply to substitute a different medium or emplacement having different properties. For example, various embodiments may involve an elasticity interchangeable medium or emplacement, wherein changing the medium or emplacement may be done to change the elasticity, a shape interchangeable medium or emplacement, wherein changing the medium or emplacement may be done to change its shape, a hardness interchangeable medium or emplacement, wherein changing the medium or emplacement may be done to change its hardness, and the like. Of course, these examples are merely illustrative of some properties of a medium or emplacement that may be changed via replacement, and should not be construed to limit the possible properties that could be changed consistent with the principles discussed herein.

In various embodiments, a resiliently flexible force dampening medium (9) or a progressively resistive elastomeric emplacement (11) may be formed from one or more separable components. Such separable components perhaps may include one or more constituent parts of the medium or emplacement that may be separated and removed without disturbing the other constituent parts. For example, a medium or emplacement in various embodiments may be established as a number of separate pieces, including perhaps two pieces, three pieces, four pieces, and so forth. Of course, the pieces may be established in any appropriate or desired size and shape relative to one another. A simple example perhaps may be to establish an annular medium or emplacement as perhaps two separate halves (25). However, this example is merely illustrative and should not be construed to limit the configurations of the separate pieces in which a medium or emplacement may be established consistent with the principles described herein. Moreover, forming a medium or emplacement from one or more separable components as described herein may increase the options for tailoring the performance characteristics of the medium or emplacement. In particular, the ability to selectively remove only parts of a medium or emplacement without disturbing the other parts may permit even finer tuning of such performance characteristics than perhaps otherwise would be possible.

Figure 10:
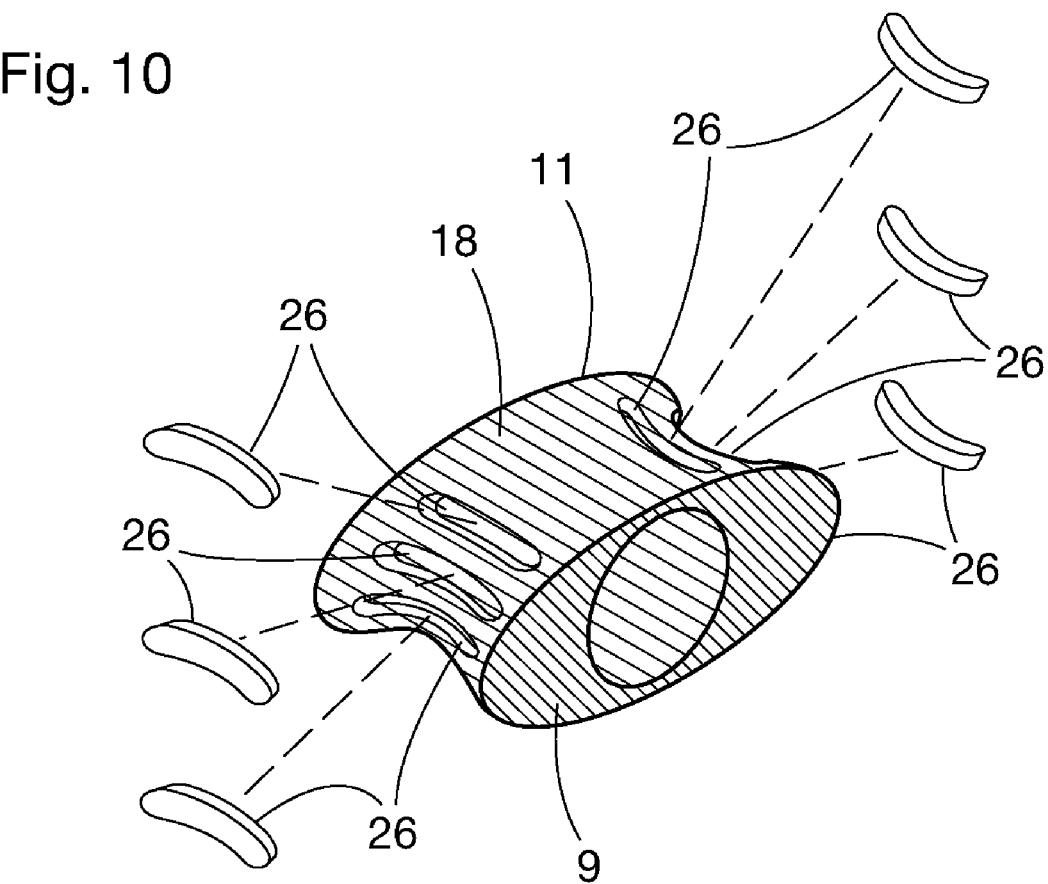
FIG. 10 is a perspective view of a separable component established as cutouts.

Now with reference primarily to FIG. 10, a separable component in some embodiments may involve removing a volume of a resiliently flexible force dampening medium (9) or a progressively resistive elastomeric emplacement (11) without substantially changing the shape of the medium or emplacement. Such a separable component may be a volume reduction and shape preservation separable component. For example, embodiments may involve forming one or more cutouts (26) on the medium or emplacement, by which a volumetric portion of the medium or emplacement may be removed while preserving the overall form of the medium or emplacement. To further preserve such overall form, a cutout (26) perhaps need not be disposed through the medium, but perhaps may exist simply as a groove on the surface of the medium. Of course, such cutouts (23) are merely illustrative of one example by which a volume of a medium or emplacement may be removed without substantially changing its shape, and should not be construed to limit the manner in which such removal otherwise may be accomplished consistent with the principles described herein. Moreover, removal of a volume of a medium or emplacement in this manner again may increase the options for tailoring the performance characteristics of the medium or emplacement. In particular, the ability to change volume without affecting shape may once more permit finer tuning of such performance characteristics than perhaps otherwise would be possible.

Now referring generally to all of the Figs., in some embodiments, a resiliently flexible force dampening medium (9) or a progressively resistive elastomeric emplacement (11) may act as a bicycle component cushioning element. This may involve perhaps simply cushioning a bicycle component with the medium or emplacement by absorbing stresses with the medium or emplacement that otherwise may be delivered to the bicycle component. Such cushioning may act to reduce wear on the bicycle component, perhaps even reducing unsafe fatigue that may lead to breakage and rider injury. For example, a medium or emplacement may tend to cushion a handlebar disposed through the medium or emplacement, thus reducing wear on the stem and handlebar as the handlebars are worked by the rider over time.

Embodiments also may involve a resiliently flexible force dampening medium (9) or a progressively resistive elastomeric emplacement (11) acting as a biomechanical rider compensation element. Of course, the various motions produced by a rider interacting with a bicycle may be understood to be biomechanical in nature. In a bicycle context, it may be desirable to permit the biomechanical motions of the rider to be carried out in as natural a movement as possible, perhaps to maximize the rider's efficiency in moving the bicycle and perhaps even to increase rider comfort and performance on the bicycle. The medium and emplacement configurations discussed herein may permit the rider's biomechanical motions to be executed with a high degree of naturalness by compensating with complementary motions of the bicycle. For example, the biomechanical motion of a rider cranking the pedals of a bicycle may tend to create rocking and other kinds of motion at a bicycle seat. Where the seat is mounted using a medium or emplacement as described herein, they may permit bicycle seat motion in a manner complementary to the rider's cranking motion. The medium or emplacement accordingly may be understood to involve action as a pedal motion compensator. Similarly, the response of a bicycle may be affected by the biomechanical grip of a rider's hands on the handlebars. For example, a relaxed grip may permit a degree of suppleness allowing the rider and bicycle to compensate for irregularities in the surface, such as perhaps ruts, dips, bumps, or the like, while a stiff grip may undermine such suppleness. Where the handlebars are mounted using a medium or emplacement as described herein, the suppleness of the response of the bicycle may be maintained to at least some degree, even where the rider may have a relatively stiff grip. The medium or emplacement accordingly may be understood to involve action as a hand grip motion compensator. Of course, these examples merely illustrate some possible embodiments wherein a medium or emplacement may act as a biomechanical rider compensation element, and should not be understood to limit the variety of manners in which the inventive technology may provide a biomechanical rider compensation element on a bicycle.

Moreover, a resiliently flexible force dampening medium (9) or a progressively resistive elastomeric emplacement (11) as described herein may act to disperse, to at least some degree, a kinetic force. Such dispersal may act to reduce the motive capability of the kinetic force as the force travels through the medium or emplacement, for instance perhaps by deadening the force in the medium or scattering the path of the force in multiple directions through the medium. For example, a kinetic force generated at a structural member (5) of a bicycle and transmitted to a substantially rigid outer housing (1) may then encounter a resiliently flexible force dampening medium (9) disposed within the outer housing. Likewise, a kinetic force generated at a bicycle component (16) of a bicycle and transmitted to a substantially rigid inner housing (2) similarly may then encounter a progressively resistive elastomeric emplacement (11) disposed between the inner housing and outer housing.

In either case, the kinetic force may be dispersed through the medium or emplacement and received at the opposing housing, where its motive capability may be relatively diminished from having been dispersed. Because of such relatively diminished motive capability, the motion to which the opposing housing may be subjected may be dampened as compared to the starting motive potential of the kinetic force when it was generated. Accordingly, motion of a bicycle component mount (3) joined to an inner housing or a structural member (5) joined to an outer housing receiving the dispersed kinetic force may be dampened, as for instance in dampening the motion of a bicycle seat mounted on a bicycle seat clamp, dampening the motion of a bicycle seat post to which an outer housing is joined, dampening the motion of a bicycle handlebar mounted on a bicycle handlebar clamp, dampening the motion of a handlebar stem to which an outer housing is joined, and so forth. Of course, these examples are merely illustrative of the manner in which kinetic forces may be dispersed and the motions of various bicycle elements dampened, and should not be construed to limit how forces may be dispersed and motions dampened consistent with the principles discussed herein.

In various embodiments a resiliently flexible force dampening medium (9) or a progressively resistive elastomeric emplacement (11) may be a force break. Such a force break may act to disrupt the travel of a force from a substantially rigid outer housing (1) to a substantially rigid inner housing (2). The effect of the force break in some embodiments perhaps may be best understood as simply disrupting the travel of force between an outer housing and inner housing to a greater degree than if the outer housing and inner housing were joined by a rigid connection. For example, in various embodiments the force break may provide a multidirectional force diffusion path, wherein rather than traveling directly from the inner housing to the outer housing, the force may be received within the break through multiple paths and multidirectionally diffused accordingly.

Now with reference primarily to FIG. 9, various embodiments may include an intermediate sleeve structure (14) disposed at the inside surface of a resiliently flexible force dampening medium (9) or progressively resistive elastomeric emplacement (11). Such an intermediate sleeve structure (14) may involve perhaps simply placing a sleeve-like structure about a substantially rigid inner housing (2), or perhaps even a bicycle component (16), to act as an intermediary between the housing or component and a medium or emplacement. Of course, the intermediate sleeve structure (14) may have any suitable configuration consistent with the principles described herein. For example, embodiments may include a sleeve having one or more layers, being completely or partially circumscribed by the medium or emplacement, being completely or partially disposed about an inner housing or bicycle component, having various degrees of rigidity, and the like.

In some embodiments, an intermediate sleeve structure (14) may have one or more contact openings (15) disposed through the sleeve, configured perhaps to allow contact of a medium or emplacement to an inner housing or bicycle component about which the sleeve is disposed. For example, some embodiments may involve configuring the interior surface of the medium or emplacement to have protrusions (19) coordinated to the location and dimension of such contact openings (15), so as perhaps to permit the protrusions (19) to be disposed through the contact openings (15). In this manner, the disposition of the protrusions (19) through the contact openings (15) may facilitate greater stability of the inner housing or bicycle component within the sleeve. In particular, the arrangement may act as a stabilization element to help stabilize the relative orientations of the substantially rigid outer housing (1), the resiliently flexible force dampening medium (9) or progressively resistive elastomeric emplacement (11), and the substantially rigid inner housing (2) or bicycle component (16) relative to one another. Such stabilization may tend to prevent any of these elements from rotating with respect to the other elements, which could result, for example, in a bicycle seat becoming detrimentally canted forward or backward for bicycle seat embodiments of the inventive technology.

Moreover, because the contact openings (15) may serve to stabilize the position of these elements relative to one another, at least some portion of the compressive force of an exterior clamp (20) may need not be utilized for such stabilization, but rather perhaps may simply to hold the assembly together. As a result, the exterior clamp (20) perhaps may require less tightening than otherwise would have been required, which in turn perhaps may preserve the flex of the resiliently flexible force dampening medium (9) or progressively resistive elastomeric emplacement (11) for the force dampening functions and motion resistance functions described elsewhere herein.

Figure 2:
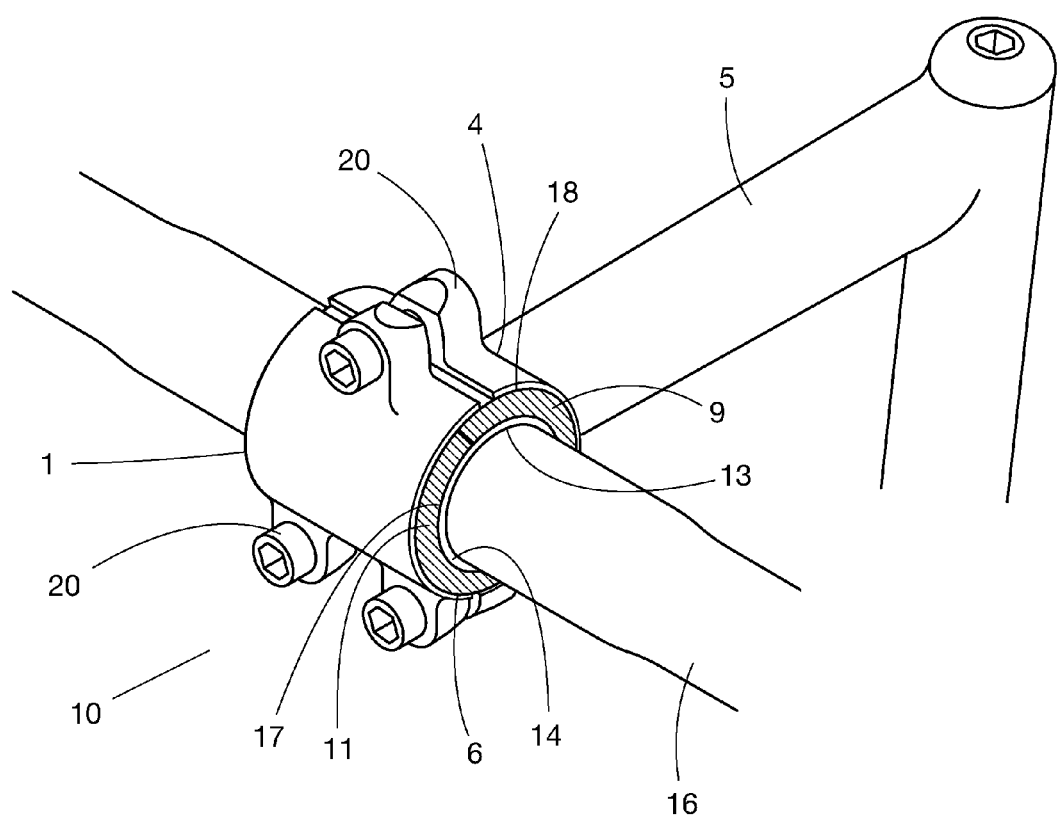
FIG. 2 is a perspective view of a bicycle handlebar clamp in one embodiment.
Figure 4:
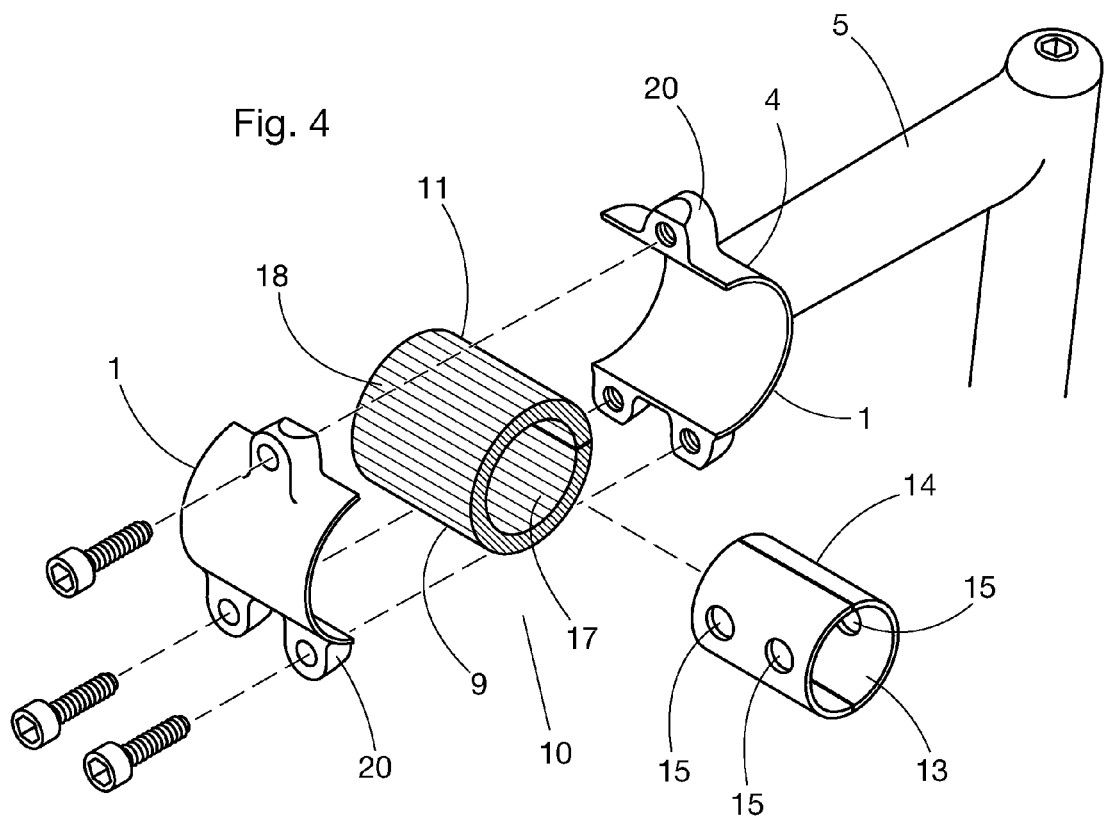
FIG. 4 is an exploded view of a bicycle component interface in one embodiment.
Figure 7A:
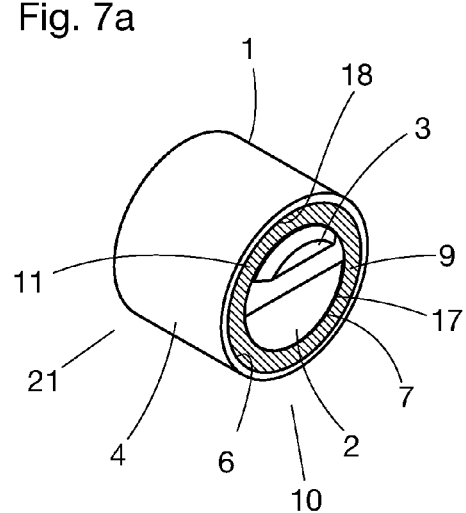
FIG. 7a is a perspective view of a substantially rigid outer housing having a uniform cross-sectional profile cylindrical in shape and circular in cross-section.
Figure 7B:
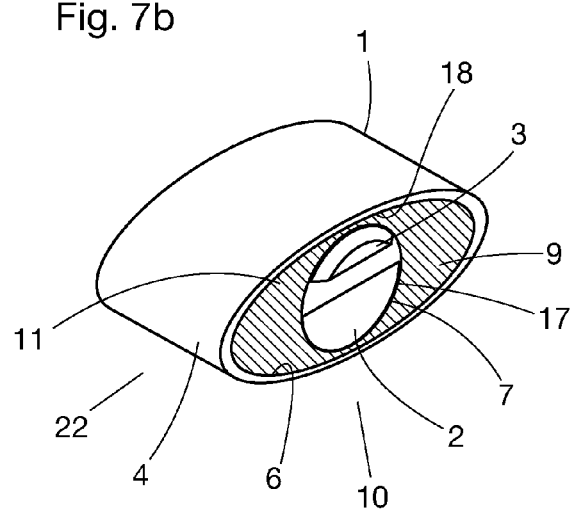
FIG. 7b is a perspective view of a substantially rigid outer housing having a uniform cross-sectional profile cylindrical in shape and elliptical in cross-section.
Figure 7C:
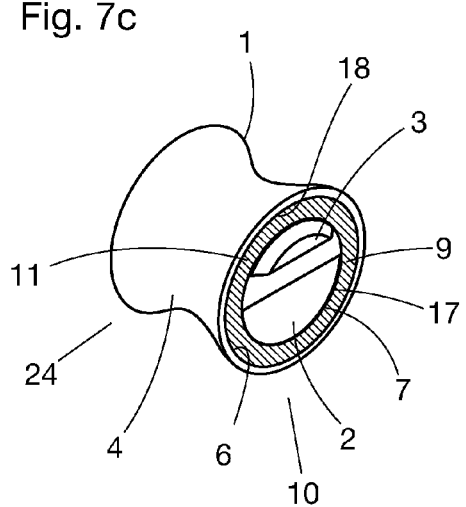
FIG. 7c is a perspective view of a substantially rigid outer housing having a varied cross-sectional profile hourglass in shape and circular in cross-section.
Figure 7D:
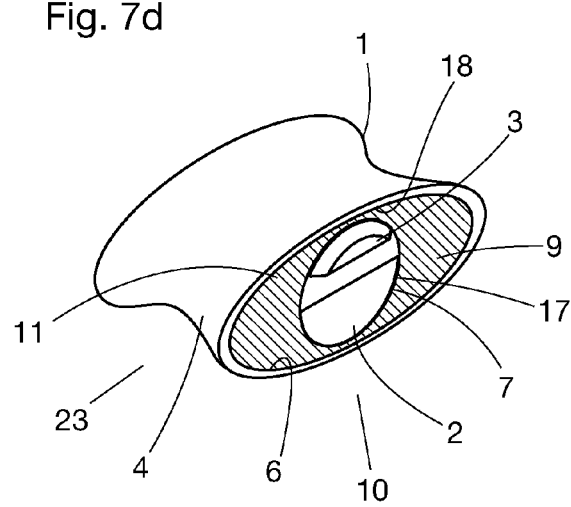
FIG. 7d is a perspective view of a substantially rigid outer housing having a varied cross-sectional profile hourglass in shape and elliptical in cross-section.

Now with reference primarily to FIGS. 2, 4, and 9, various embodiments may involve a bicycle component interface (13) in lieu of a substantially rigid inner housing (2). Accordingly, the principles discussed herein with respect to a substantially rigid inner housing (2) may apply to bicycle component interface (13) embodiments as well, perhaps subject to aspects specific to the bicycle component interface (13) as discussed herein. A bicycle component interface (13) may include perhaps simply an area disposed within an interior surface (17) of a resiliently flexible force dampening medium (9) at which the surface of a bicycle component (16) received through the medium may interact with the medium. In some embodiments, the bicycle component interface (13) may be simply the interior surface (17) of the medium itself, and the interface may involve direct contact between the component and the medium. In other embodiments, a bicycle component interface (13) may involve perhaps an intermediate sleeve structure (14) disposed within the interior surface of the medium, and the interface may involve interaction of the bicycle component (16) with the medium through the intermediate sleeve structure (14). An intermediate sleeve structure (14) acting as a bicycle component interface (13) of course may be established in any configuration consistent with the interface principles described herein.

Embodiments may involve receiving various kinds of bicycle components (16) within a bicycle component interface (13). For example, in some embodiments the bicycle component (16) may include a shaft, as in perhaps the shaft of a handlebar, placed through the outer housing and the medium, about which the bicycle component interface (13) is disposed. The shaft in various embodiments may have a constant diameter, for example as opposed to having a bulge or a scooped portion. Moreover, from the interface principles described herein, it may become apparent that a resiliently flexible force dampening medium (9) or an equivalent need not be established on the bicycle component itself, in as much as the present inventive technology permits the medium to be established opposite the bicycle component (16) across a bicycle component interface (13). Accordingly, the inventive technology may allow for the use of conventional, standardized bicycle components, without requiring special manufacturing of such components where the use of a resiliently flexible force dampening medium (9) or its equivalent is desired.

As may be easily understood from the foregoing, the basic concepts of the present inventive technology may be embodied in a variety of ways. It may involve both bicycle component mounting techniques as well as devices to accomplish the appropriate bicycle component mounts. In this application, the bicycle component mounting techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "mount" should be understood to encompass disclosure of the act of "mounting"—whether explicitly discussed or not—and, conversely, were there effectively disclosure of the act of "mounting", such a disclosure should be understood to encompass disclosure of a "mount" and even a "means for mounting". Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the following are hereby appended and hereby incorporated by reference, however, as to each of the above, to the extent that such information or statements incorporated by reference might be considered inconsistent with the patenting of this/these inventive technology such statements are expressly not to be considered as made by the applicant(s).

I. U.S. PATENT DOCUMENTS

| DOCUMENT NO. & KIND CODE (if known) | PUB'N DATE mm-dd-yyyy | PATENTEE OR APPLICANT NAME |
|---|---|---|
| 6,010,188 | 01/04/2000 | Yates |
| 6,019,422 | 02/01/2000 | Taormino et al. |
| 5,222,781 | 06/29/1993 | Mele |
| 5,308,140 | 05/03/1994 | Yu |
| 5,551,753 | 09/03/1996 | Glockl |
| 6,079,774 | 06/27/2000 | Proust |
| 5,048,891 | 09/17/1991 | Yach |
| 4,369,998 | 01/25/1983 | Blase |
| 3,989,263 | 11/02/1973 | Stuck et al. |
| 7,044,542 B2 | 05/16/2006 | Muscat |
| 5,319,995 | 06/14/1994 | Huang |
| 2,274,747 | 03/03/1942 | Schwinn |

II. NON-PATENT LITERATURE DOCUMENTS

VeloSmart News, Vellosaddles.com, FSS, the Globe Suspension System, Velo Saddles, velosaddles.com/technology.php Globe Suspension, May 15, 2007
Bicycling, Gear, Everything Butt, July 2007
Bishingsinc.com, Bushings & Mounting Rubberflex; Jun. 11, 2007, 3 pages

II. NON-PATENT LITERATURE DOCUMENTS

Wixroyd.com, Anti-vibration-bushes, Oct. 11, 2006 1 page
Naval-technology.com, GMT Rubber-Metal-Technic Ltd., Jun. 11, 2007 1 page
Apexmolded.com, Apex Molded Products Company, Inc., Isolators, Jun. 11, 2007, 1 page
Tech Products Corporation, Armor Plated Universal, Jun. 11, 2007, 2 pages
Corryrubber.com, Corry Rubber Corporation, Stud Mount Series, Jun. 11, 2007, 3 pages
Acousticalsolutions.com, Isolation Clip ARSIC, Jun. 11, 2007, 3 pages
Earsc.com, EAR Specialty Composites, ISOLOSS Grommets; HD/VA Sandwich Mounts: Male-Male; Jun. 11, 2007, 2 pages
Earsc.com, EAR Specialty Composites, ISODAMP and VersaDamp Equipment Mounts; Jun. 11, 2007, 2 pages
Rubber-group.com; The Rubber Group, Isolation mounts; Jun. 11, 2007
Vibrasystems.com; VibraSystems, Inc. Anti-Vibration Products; Jun. 11, 2007

Thus, the applicant(s) should be understood to have support to claim and make a statement of invention to at least: i) each of the bicycle component mounting devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A bicycle component mounting apparatus comprising:
 a motionally resistive substantially rigid outer housing having an exterior surface configured to be joined to a structural member of a bicycle and an interior surface formed by an opening established through said substantially rigid outer housing;
 a substantially rigid inner housing having an exterior surface and disposed within said opening established through said substantially rigid outer housing;
 a bicycle component mount joined to said substantially rigid inner housing;
 a center of mass of said bicycle component mount joined to said substantially rigid inner housing;
 a progressively resistive elastomeric emplacement within which said bicycle component mount joined to said substantially rigid inner housing is emplaced;
 a multidirectional arrangement about said bicycle component mount joined to said substantially rigid inner housing of said progressively resistive elastomeric emplacement configured to respond to multidimensional motion of said center of mass;
 a resiliently flexible force dampening medium interposed between said exterior surface of said substantially rigid inner housing and said interior surface of said substantially rigid outer housing;
 an isolationally configured arrangement of said resiliently flexible force dampening medium about said substantially rigid inner housing and within said substantially rigid outer housing;
 an intermediate sleeve structure disposed about said substantially rigid inner housing;
 at least one contact opening disposed through said intermediate sleeve structure;

at least one protrusion established on said interior surface of said resiliently flexible force dampening medium coordinated to the location and dimension of said at least one contact opening and disposed through said contact opening;

a stabilization element for said substantially rigid outer housing, said resiliently flexible force dampening medium, and said substantially rigid inner housing.

2. A bicycle component mounting apparatus as described in claim 1 wherein said structural member comprises a bicycle seat post, wherein said bicycle component mount comprises a bicycle seat clamp, and further comprising a bicycle seat mounted on said bicycle seat clamp.

3. A bicycle component mounting apparatus as described in claim 1 wherein said substantially rigid outer housing comprises an annular substantially rigid outer housing, wherein said resiliently flexible force dampening medium comprises an annular resiliently flexible force dampening medium, wherein said progressively resistive elastomeric emplacement comprises an annular progressively resistive elastomeric emplacement, and wherein said substantially rigid inner housing comprises an inner housing disposed within said annular resiliently flexible force dampening medium and said annular progressively resistive elastomeric emplacement.

4. A bicycle component mounting apparatus as described in claim 3 further comprising a uniform cross-sectional profile along a lengthwise axis of said annular substantially rigid outer housing and said substantially rigid inner housing.

5. A bicycle component mounting apparatus as described in claim 4 wherein said uniform cross-sectional profile comprises a cylindrical annular substantially rigid outer housing and a cylindrical substantially rigid inner housing, each said cylinder dimensioned in cross-section as a circle.

6. A bicycle component mounting apparatus as described in claim 4 wherein said uniform cross-sectional profile comprises a cylindrical annular substantially rigid outer housing dimensioned in cross-section as a horizontally oriented ellipse with respect to the front end and rear end of a bicycle and a cylindrical substantially rigid inner housing dimensioned in cross-section as a circle.

7. A bicycle component mounting apparatus as described in claim 3 further comprising a varied cross-sectional profile along a lengthwise axis of said annular substantially rigid outer housing and said substantially rigid inner housing.

8. A bicycle component mounting apparatus as described in claim 7 wherein said varied cross-sectional profile comprises an hourglass-shaped annular substantially rigid outer housing dimensioned in cross-section as a circle and a cylindrical substantially rigid inner housing dimensioned in cross-section as a circle.

9. A bicycle component mounting apparatus as described in claim 7 wherein said varied cross-sectional profile comprises an hourglass-shaped annular substantially rigid outer housing dimensioned in cross-section as a horizontally oriented ellipse with respect to the front end and rear end of a bicycle and a cylindrical substantially rigid inner housing dimensioned in cross-section as a circle.

10. A bicycle component mounting apparatus as described in claim 1 further comprising a clamp to which said substantially rigid outer housing is compressively responsive.

11. A bicycle component mounting apparatus as described in claim 1 wherein said resiliently flexible force dampening medium and said progressively resistive elastomeric emplacement comprise a number of separate pieces.

12. A bicycle component mounting apparatus as described in claim 1 wherein said number of separate pieces comprise at least one cutout formed on said resiliently flexible force dampening medium and said progressively resistive elastomeric emplacement.

13. A method for mounting a bicycle component on a bicycle comprising the steps of:

creating a motion at a bicycle component;

generating a kinetic force as a result of said step of creating a motion;

transmitting said kinetic force to a bicycle component mount joined to a substantially rigid inner housing;

isolating said substantially rigid inner housing from a substantially rigid outer housing by interposing a resiliently flexible force dampening medium within said substantially rigid outer housing and about said substantially rigid inner housing;

multidimensionally moving a center of mass of said bicycle component mount joined to said substantially rigid inner housing as a result of said step of transmitting said kinetic force;

progressively elastomerically resisting said movement of said center of mass in multiple directions about said bicycle component mount joined to said substantially rigid inner housing;

establishing an intermediate sleeve structure having at least one contact opening disposed there through about said substantially rigid inner housing;

disposing at least one protrusion established on an interior surface of said resiliently flexible force dampening medium and coordinated to the location and dimension of said at least one contact opening through said contact opening;

stabilizing the orientations of said substantially rigid outer housing, said resiliently flexible force dampening medium, and said substantially rigid inner housing relative to one another;

dispersing at least some of said kinetic force through said interposed resiliently flexible force dampening medium;

receiving said dispersed kinetic force at said substantially rigid outer housing;

dampening a motion of a structural member of a bicycle joined to said substantially rigid outer housing and receiving said dispersed kinetic force.

14. A method for mounting a bicycle component on a bicycle as described in claim 13 wherein said step of creating a motion comprises the step of creating a motion at a bicycle seat mounted on a bicycle seat clamp, wherein said step of transmitting said kinetic force comprises the step of transmitting said kinetic force to said bicycle seat clamp, and wherein said step of dampening a motion comprises the step of dampening a motion of a bicycle seat post.

15. A method for mounting a bicycle component on a bicycle as described in claim 13 further comprising the steps of establishing said substantially rigid outer housing as an annular substantially rigid outer housing, establishing said resiliently flexible force dampening medium as an annular resiliently flexible force dampening medium disposed within said annular substantially rigid outer housing, and establishing said substantially rigid inner housing disposed within said annular resiliently flexible force dampening medium.

16. A method for mounting a bicycle component on a bicycle as described in claim 15 further comprising the step of establishing a uniform cross-sectional profile along a lengthwise axis of said annular substantially rigid outer housing, said annular resiliently flexible force dampening medium, and said substantially rigid inner housing.

17. A method for mounting a bicycle component on a bicycle as described in claim 16 wherein said step of establishing a uniform cross-sectional profile comprises the step of establishing a cylindrical annular substantially rigid outer housing and a cylindrical substantially rigid inner housing, each said cylinder dimensioned in cross-section as a circle.

18. A method for mounting a bicycle component on a bicycle as described in claim 16 wherein said step of establishing a uniform cross-sectional profile comprises the step of establishing a cylindrical annular substantially rigid outer housing dimensioned in cross-section as a horizontally oriented ellipse with respect to the front end and rear end of a bicycle and a cylindrical substantially rigid inner housing dimensioned in cross-section as a circle.

19. A method for mounting a bicycle component on a bicycle as described in claim 15 further comprising the step of establishing a varied cross-sectional profile along a lengthwise axis of said annular substantially rigid outer housing, said annular resiliently flexible force dampening medium, and said substantially rigid inner housing.

20. A method for mounting a bicycle component on a bicycle as described in claim 19 wherein said step of establishing a varied cross-sectional profile comprises the step of establishing an hourglass-shaped annular substantially rigid outer housing dimensioned in cross-section as a circle and a cylindrical substantially rigid inner housing dimensioned in cross-section as a circle.

21. A method for mounting a bicycle component on a bicycle as described in claim 19 wherein said step of establishing a varied cross-sectional profile comprises the step of establishing an hourglass-shaped annular substantially rigid outer housing dimensioned in cross-section as a horizontally oriented ellipse with respect to the front end and rear end of a bicycle and a cylindrical substantially rigid inner housing dimensioned in cross-section as a circle.

22. A method for mounting a bicycle component on a bicycle as described in claim 13 further comprising the step of compressing said substantially rigid outer housing.

23. A method for mounting a bicycle component on a bicycle as described in claim 13 further comprising the step of removing at least one separate piece of said resiliently flexible force dampening medium established as a number of separate pieces.

24. A method for mounting a bicycle component on a bicycle as described in claim 23 wherein said step of removing at least one separate piece comprises the step of removing a cutout to reduce a volume of said resiliently flexible force dampening medium without changing a shape of said resiliently flexible force dampening medium.

* * * * *